United States Patent
Lim et al.

(10) Patent No.: US 8,400,952 B2
(45) Date of Patent: *Mar. 19, 2013

(54) METHOD FOR TRANSCEIVING A SIGNAL IN WIRELESS COMMUNICATION SYSTEM

(75) Inventors: Dong Guk Lim, Gyeonggi-do (KR); Sung Ho Moon, Gyeonggi-do (KR); Han Gyu Cho, Gyeonggi-do (KR); Yeong Hyeon Kwon, Gyeonggi-do (KR); Jin Sam Kwak, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 369 days.

This patent is subject to a terminal disclaimer.

(21) Appl. No.: 12/753,320

(22) Filed: Apr. 2, 2010

(65) Prior Publication Data

US 2010/0254289 A1 Oct. 7, 2010

Related U.S. Application Data

(60) Provisional application No. 61/166,252, filed on Apr. 3, 2009.

(30) Foreign Application Priority Data

Jul. 24, 2009 (KR) .................. 10-2009-0067839

(51) Int. Cl.
*H04J 1/04* (2006.01)
*H04J 11/00* (2006.01)
*H04B 7/208* (2006.01)

(52) U.S. Cl. ........ 370/281; 370/330; 370/344; 370/295; 370/208; 375/260

(58) Field of Classification Search .................. 370/280, 370/342–343, 335, 203, 208, 294, 295, 464, 370/479, 336, 206, 281, 328, 329, 330, 344; 375/260

See application file for complete search history.

(56) References Cited

U.S. PATENT DOCUMENTS

| | | | | |
|---|---|---|---|---|
| 8,000,272 B2* | 8/2011 | Gao et al. | ........ | 370/280 |
| 8,031,583 B2* | 10/2011 | Classon et al. | ........ | 370/208 |
| 8,165,106 B2* | 4/2012 | Yang et al. | ........ | 370/350 |
| 2007/0070945 A1 | 3/2007 | Wang et al. | | |
| 2007/0153735 A1* | 7/2007 | Frederiksen et al. | ........ | 370/329 |
| 2008/0039107 A1* | 2/2008 | Ma et al. | ........ | 455/450 |
| 2008/0095195 A1* | 4/2008 | Ahmadi et al. | ........ | 370/478 |
| 2008/0107047 A1* | 5/2008 | Olfat | ........ | 370/280 |
| 2008/0176577 A1* | 7/2008 | Bourlas et al. | ........ | 455/454 |
| 2009/0067377 A1* | 3/2009 | Talukdar et al. | ........ | 370/329 |
| 2009/0122771 A1* | 5/2009 | Cai | ........ | 370/338 |
| 2010/0061326 A1* | 3/2010 | Lee et al. | ........ | 370/329 |
| 2010/0142458 A1* | 6/2010 | Mark | ........ | 370/329 |
| 2010/0165972 A1* | 7/2010 | Lin et al. | ........ | 370/344 |
| 2011/0041027 A1* | 2/2011 | Fong et al. | ........ | 714/749 |

FOREIGN PATENT DOCUMENTS

CN 101360081 2/2009

* cited by examiner

*Primary Examiner* — Kwang B Yao
*Assistant Examiner* — Candal Elpenord
(74) *Attorney, Agent, or Firm* — Lee, Hong, Degerman, Kang & Waimey

(57) ABSTRACT

A method of transmitting a signal using a prescribed frame structure in a wireless communication system is disclosed. A mobile station is able to transmit or receive a signal using a frame structure with a CP length corresponding to ¼ of a useful symbol. Moreover, the mobile station is able to transmit or receive a signal using a frame structure with a CP length corresponding to ¼ of a useful symbol, which is designed to mutually coexist without causing collision or interference with another frame structure with a different CP length. In this case, a channel bandwidth of the prescribed frame structure is 7 MHz.

4 Claims, 14 Drawing Sheets

METHOD FOR TRANSCEIVING A SIGNAL IN WIRELESS COMMUNICATION SYSTEM

Pursuant to 35 U.S.C. §119, this application claims the benefit of priority to Provisional Application No. 61/166,252, filed on Apr. 03, 2009, and claims the benefit of earlier filing date and right of priority to Korean patent application No. 10-2009-0067839, filed on Jul. 24, 2009, the contents of all of which are incorporated by reference herein in their entirety.

BACKGROUND OF THE INVENTION

1. Field of the Invention

The present invention relates to a signal transmitting method, and more particularly, to a method of transmitting a signal in a wireless communication system using a prescribed frame structure.

2. Discussion of the Related Art

Generally, IEEE 802.16m system is able to support FDD (frequency division duplex) including H-FDD (half-frequency division duplex) mobile station operation and TDD time division duplex) both. The IEEE 802.16m system uses OFDMA (orthogonal frequency division multiplexing access) as a multiple access scheme in DL (downlink) and UL (uplink). Contents for OFDMA parameters are shown in Table 1.

symbols. And, a third type can be defined as a subframe including 6 OFDMA symbols.

A basic frame structure is applicable to FDD including H-FDD mobile station operation and TDD both. The number of switching points in each radio frame of TDD system is 2. The switching point can be defined according to a change of directionality from downlink to uplink or uplink to downlink.

H-FDD mobile station can be included in FDD system. A frame structure in viewpoint of the H-FDD mobile station is similar to a TDD frame structure. Yet, downlink and uplink transmissions occur in two individual frequency bands. Transmission gaps between downlink and uplink (and vice versa) are requested to switch transmitting and receiving circuits to each other.

FIG. 2 is a diagram for an example of TDD frame having a DL-to-UL ratio set to 5:3.

Referring to FIG. 2, assuming that an OFDMA symbol duration is 102.857 μs and that a CP (cyclic prefix) length is set to a length corresponding to ⅛ of a useful symbol length ($T_u$), lengths of first and second type subframes are 0.617 ms and 0.514 ms, respectively. A last DL (downlink) subframe SF4 is a subframe of a third type. And, a TTG (transmit transition gap) and an RTG (receive transition gap) are set to 105.714 μs and 60 μs, respectively. According to another numerology, the number of subframes per frame and the number of symbols within a subframe may be different.

TABLE 1

| Nominal Channel Bandwidth (MHz) | | | 5 | 7 | 8.75 | 10 | 20 |
|---|---|---|---|---|---|---|---|
| Over-sampling Factor | | | 28/25 | 8/7 | 8/7 | 28/25 | 28/25 |
| Sampling Frequency (MHz) | | | 5.6 | 8 | 10 | 11.2 | 22.4 |
| FFT Size | | | 512 | 1024 | 1024 | 1024 | 2048 |
| Sub-Carrier Spacing (kHz) | | | 10.937500 | 7.812500 | 9.765625 | 10.937500 | 10.937500 |
| Useful Symbol Time $T_u$ (μs) | | | 91.429 | 128 | 102.4 | 91.429 | 91.429 |
| Cyclic Prefix (CP) $T_g = \frac{1}{8} T_u$ | Symbol Time $T_s$ (μs) | | 102.857 | 144 | 115.2 | 102.857 | 102.857 |
| | FDD | Number of OFDM symbols per Frame | 48 | 34 | 43 | 48 | 48 |
| | | Idle time (μs) | 62.857 | 104 | 46.40 | 62.857 | 62.857 |
| | TDD | Number of OFDM symbols per Frame | 47 | 33 | 42 | 47 | 47 |
| | | TTG + RTG (μs) | 165.714 | 248 | 161.6 | 165.714 | 165.714 |
| Cyclic Prefix (CP) $T_g = \frac{1}{16} T_u$ | Symbol Time $T_s$ (μs) | | 97.143 | 136 | 108.8 | 97.143 | 97.143 |
| | FDD | Number of OFDM symbols per Frame | 51 | 36 | 45 | 51 | 51 |
| | | Idle time (μs) | 45.71 | 104 | 104 | 45.71 | 45.71 |
| | TDD | Number of OFDM symbols per Frame | 50 | 35 | 44 | 50 | 50 |
| | | TTG + RTG (μs) | 142.853 | 240 | 212.8 | 142.853 | 142.853 |
| Cyclic Prefix (CP) $T_g = \frac{1}{4} T_u$ | Symbol Time $T_s$ (μs) | | 114.286 | [TBD] | [TBD] | 114.286 | 114.286 |
| | FDD | Number of OFDM symbols per Frame | 43 | [TBD] | [TBD] | 43 | 43 |
| | | Idle time (μs) | 85.694 | [TBD] | [TBD] | 85.694 | 85.694 |
| | TDD | Number of OFDM symbols per Frame | 42 | [TBD] | [TBD] | 42 | 42 |
| | | TTG + RTG (μs) | 199.98 | [TBD] | [TBD] | 199.98 | 199.98 |

In the following description, a frame structure of the IEEE 802.16m system is schematically explained.

FIG. 1 is a diagram of a basic frame structure in IEEE 802.16m system.

Referring to FIG. 1, each 20 ms super frame is divided into four 5 ms radio frames equal to each other in size. And, the corresponding super frame starts with a super frame header (SFH). In case of using the same OFDMA parameters of Table 1 within a channel bandwidth selected from 5 MHz, 10 MHz and 20 MHz, each of the 5 ms radio frames is constructed with eight subframes. One subframe can be allocated for downlink or uplink transmission. A first type can be defined as a subframe including 6 OFDMA symbols. A second type can be defined as a subframe including 7 OFDMA FIG. 3 is a diagram for an example of a frame structure in FDD system.

Referring to FIG. 3, a base station supporting FDD system is able to simultaneously support half-duplex mobile station operating with a same RF carrier and a full-duplex mobile station both. A mobile station supporting FDD system should use either H-FDD system or FDD system. All subframes are available for both DL and UL transmissions. The DL and UL transmissions can be discriminated from each other in frequency domain. One super frame is divided into 4 frames. And, one of the frames includes 8 subframes.

FIG. 4 is a diagram for TDD and FDD frame structures with CP length corresponding to 1/16 of a useful symbol length ($T_u$).

Referring to FIG. 4, a frame of IEEE 802.16m system, which has a CP length corresponding to 1/16 of a useful symbol length (Tu) for channel bandwidths of 5 MHz, 10 MHz and 20 MHz, includes 5 first type subframes and 3 second type subframes in FDD system or includes 6 first type subframes and 2 second type subframes in TDD system.

Assuming that an OFDMA symbol duration is 97.143 us and that a CP (cyclic prefix) length is set to a length corresponding to 1/16 of a useful symbol length (Tu), lengths of the first and second type subframes are 0.583 ms and 0.680 ms, respectively. And, a TTG (transmit transition gap) and an RTG (receive transition gap) are set to 82.853 μs and 60 μs, respectively. According to another numerology, the number of subframes per frame and the number of symbols within a subframe may be different.

As mentioned in the foregoing description, in the IEEE 802.16m system, OFDMA parameters and frame structures for channel bandwidths of 5 MHz, 10 MHz and 20 MHz are only defined for a case that a CP length is 1/8 Tb and a case that a CP length is 1/16 Tb. Namely, a frame structure for a case that a CP length is 1/4 Tb has not been proposed so far.

A frame structure with a CP length of 1/4 Tb may cause a problem with a previous frame structure with a CP length of 1/8 or 1/16 Tb that interference is generated from a switching point between downlink and uplink. However, a new frame structure enabling mutual co-existence by solving this problem has not been proposed so far.

In the IEEE 802.16m system, OFDMA parameters and frame structures with a cp length of 1/8 Tb and 1/16 Tb are defined for 7 MHz channel bandwidth only but definition has not been made for 1/4 Tb yet. A frame structure with a CP length of 1/4 Tb can coexist together with frame structure fore 7 MHz channel bandwidth without interference has not proposed.

SUMMARY OF THE INVENTION

Accordingly, the present invention is directed to a method of transmitting a signal in a wireless communication system that substantially obviates one or more problems due to limitations and disadvantages of the related art.

An object of the present invention is to provide a method of transmitting a signal in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transceiving using a frame structure in a wireless communication system, the method includes the steps of transceiving a signal through a frame according to the frame structure, wherein the frame comprises 5 subframes, the 5 subframes comprise at least one of a first type subframe including 6 OFDMA (orthogonal frequency division multiple access) symbols or a second type subframe including 7 OFDMA symbols.

Preferably, the frame is a TDD (time division duplex) frame or an FDD (frequency division duplex) frame.

Preferably, the frame is the TDD frame, and each of the 5 subframes in the TDD frame is the first type subframe.

In this case, the TDD frame includes a downlink interval and an uplink interval subsequent to the downlink interval, a TTG (transmit transition gap) is located between the downlink interval and the uplink interval in the TDD frame, and an RTG (receive transition gap) is located next to a last subframe of the uplink interval in the TDD frame.

And, a ratio of the number of DL subframes to the number of UL subframes in the TDD frame is set to one of (2:3), (3:2), and (4:1).

The second type subframe in the FDD frame is located in the same order of a last downlink subframe located in the TDD frame.

Preferably, the second type subframe is located at a fourth subframe in the FDD frame.

The FDD frame includes 4 first type subframes and 1 second type subframe.

Preferably, an idle time is located next to a last subframe in the FDD frame.

The frame comprises a CP (Cyclic Prefix), a length is set to 1/4 of a useful symbol length. A channel bandwidth of the frame is set to 7 MHz.

In another aspect of the present invention, an apparatus for transceiving a signal using a frame structure in a wireless communication system, the apparatus includes transceiving module for transceiving a signal through a frame according to the frame structure, wherein the frame comprises 5 subframes, and the 5 subframes at least one of a first type subframe including 6 OFDMA (orthogonal frequency division multiple access) symbols or a second type subframe including 7 OFDMA symbols.

Accordingly, the present invention provides the following effects and/or advantages.

First of all, the frame structure for 7 MHz channel bandwidth with a cp length of 1/4 Tb according to the present invention may coexist mutually with a frame structure with a previously defined CP length of 1/16 Tb and a cp length of 1/8 Tb without interference at DL/UL switching interval.

Secondly, the frame structure for 7 MHz channel bandwidth with a cp length of 1/4 Tb is proposed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
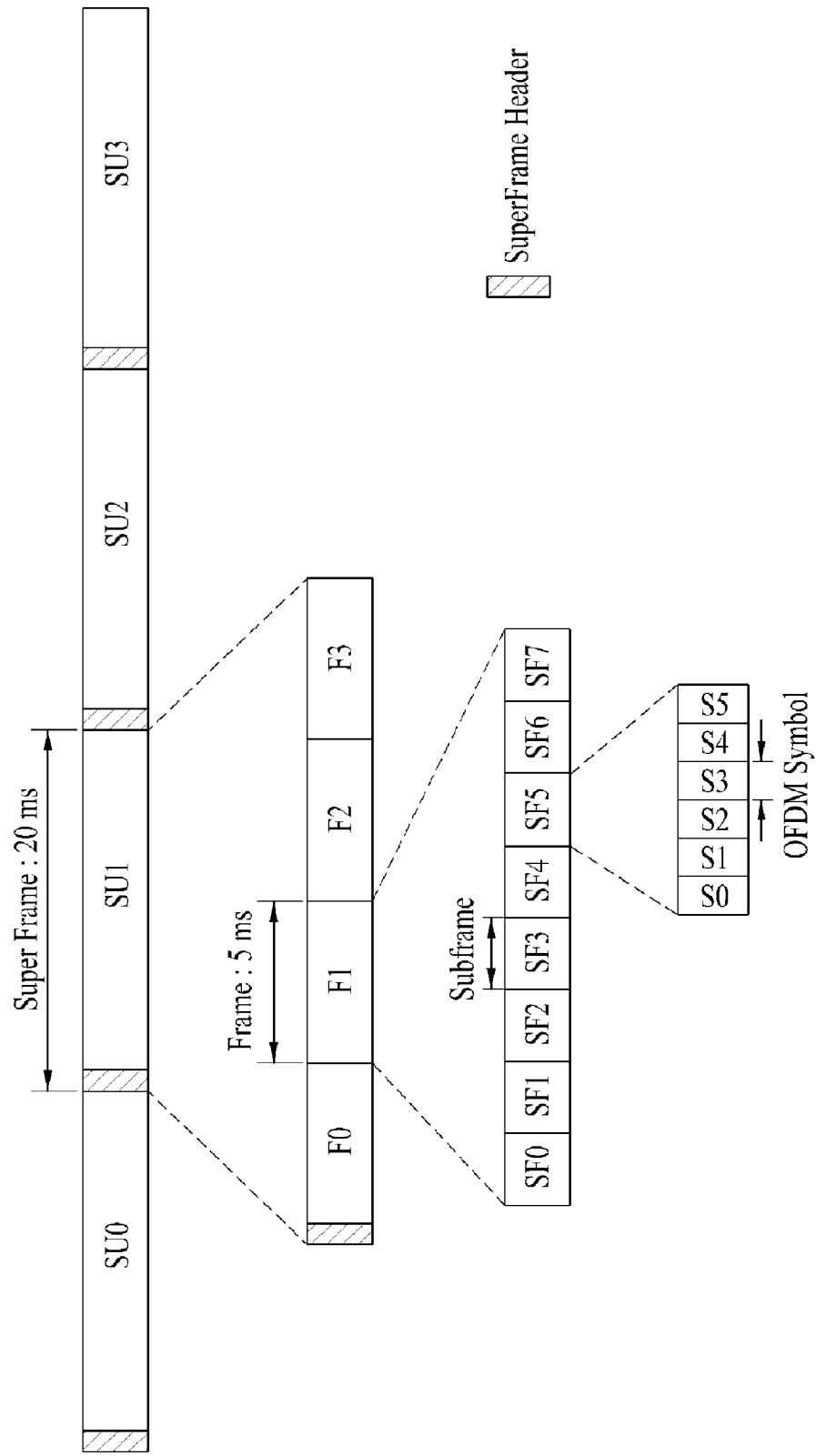
FIG. 1 is a diagram of a basic frame structure in IEEE 802.16m system.
Figure 2:
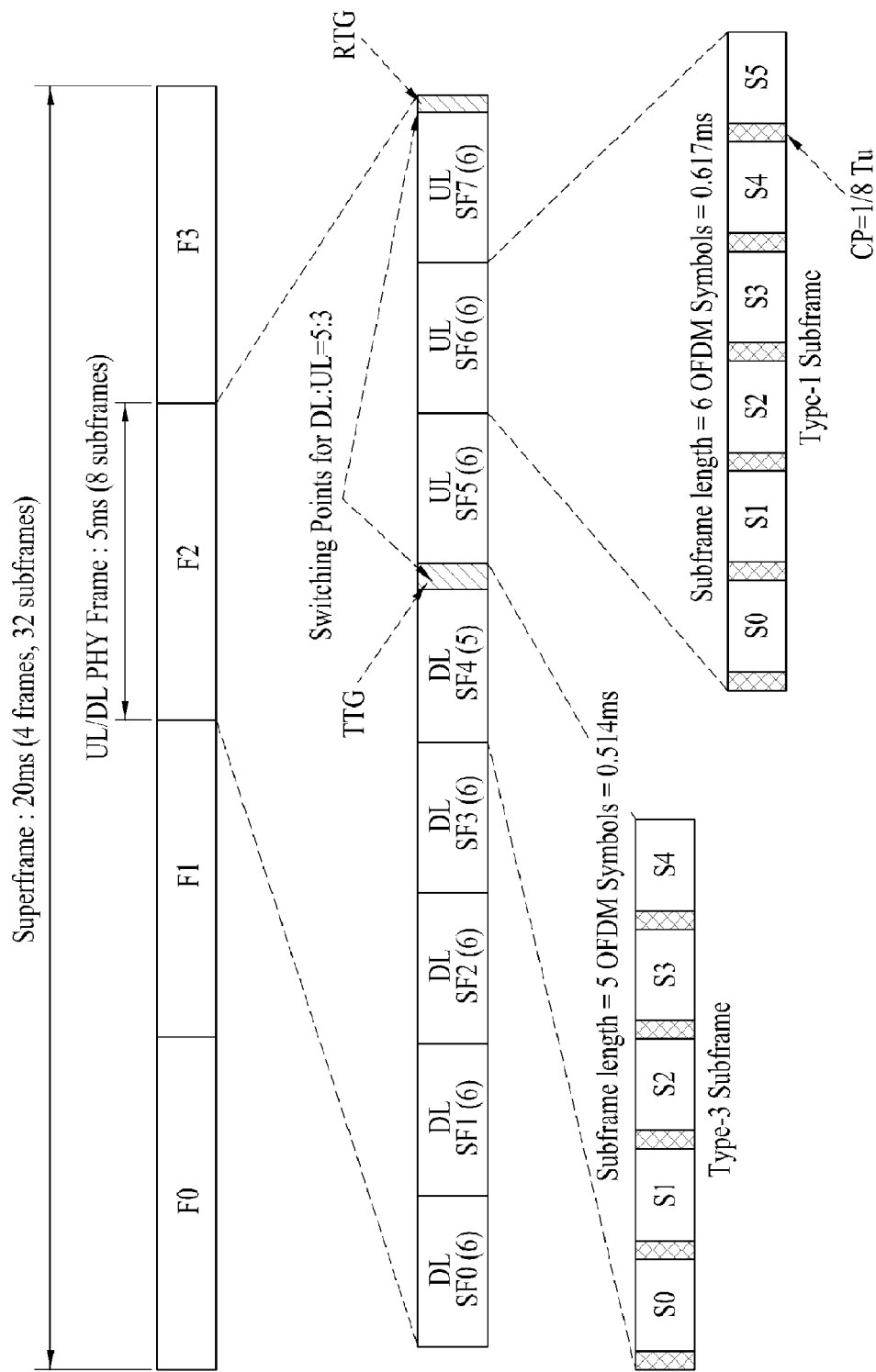
FIG. 2 is a diagram for an example of TDD frame having a DL-to-UL ratio set to 5:3.
Figure 3:
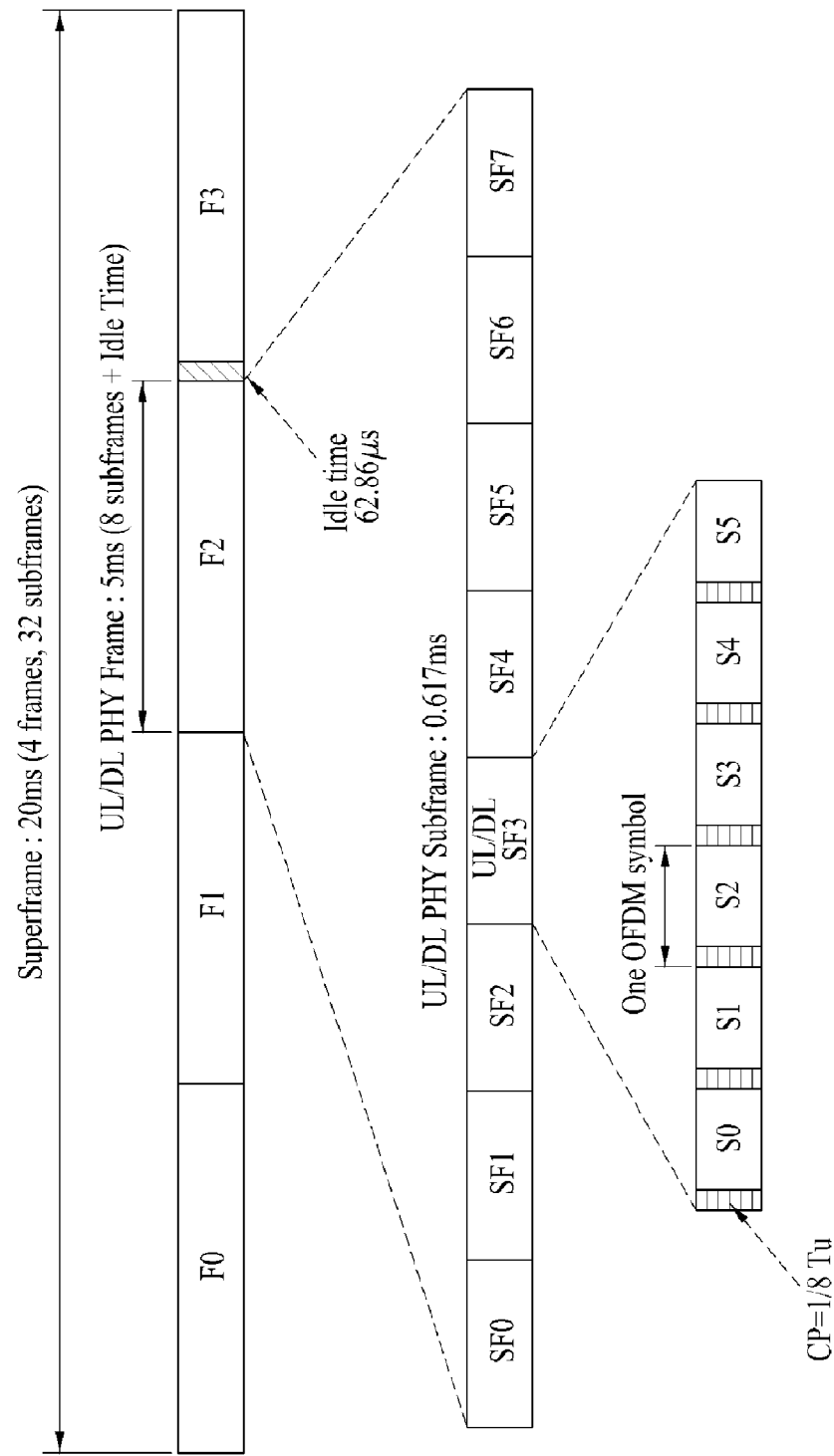
FIG. 3 is a diagram for an example of a frame structure in FDD system.
Figure 4:
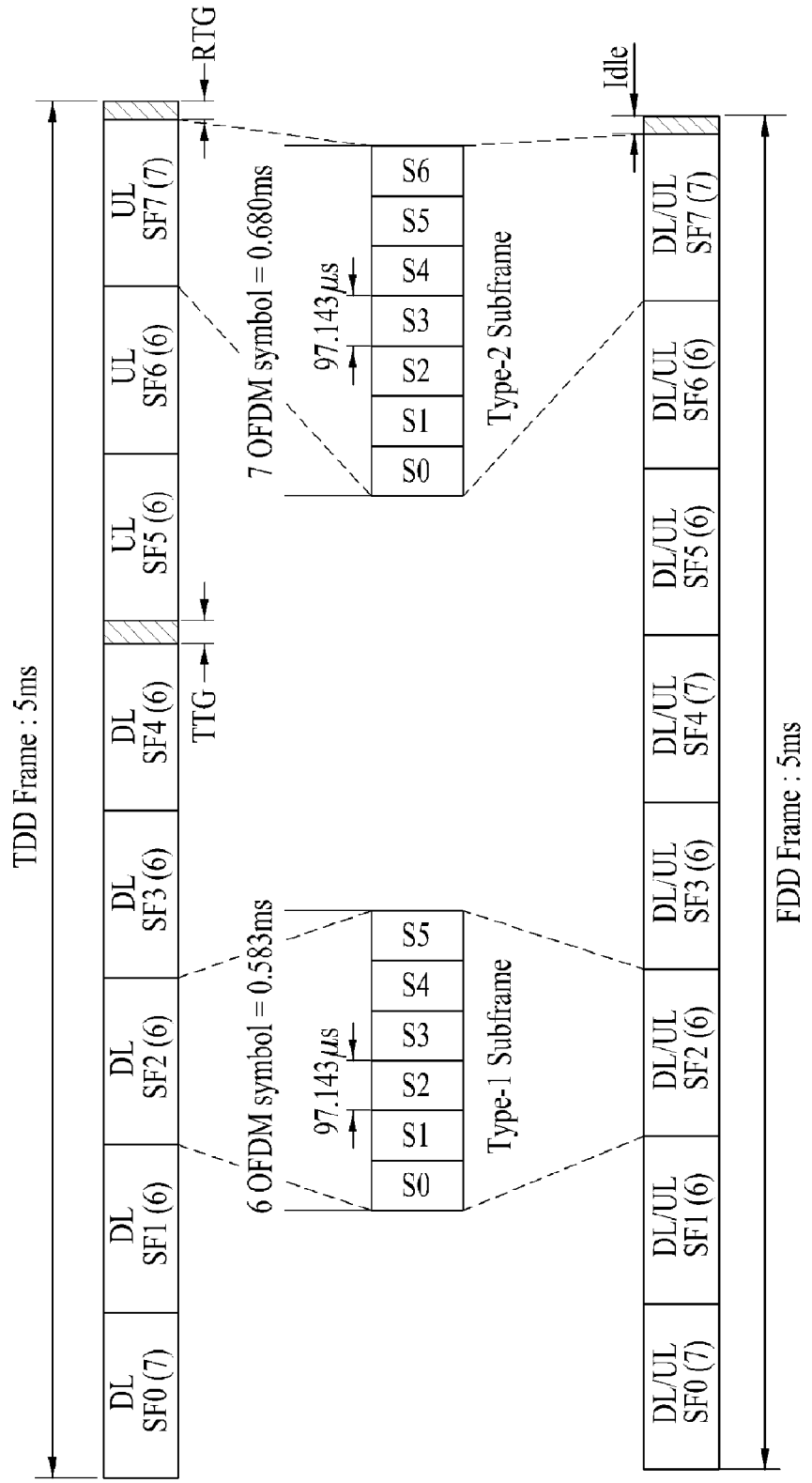
FIG. 4 is a diagram for TDD and FDD frame structures with CP length corresponding to 1/16 of a useful symbol length (Tu)

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made centering on predetermined terminologies, they need not to be limited to the terminologies. If the following descriptions are made using random terminologies, the same meanings can be provided. Wherever possible, the same reference numbers will be used throughout the drawings to refer to the same or like parts.

Throughout this disclosure, if a prescribed part 'includes' a prescribed element, it means that another element can be further included instead of eliminating other elements as long as absence of special objection.

The following descriptions are applicable to various communication systems, which are capable of providing various communication services of audio data, packet data, and the like. The technology of the communication system is usable in DL (downlink) or UL (uplink). In this case, 'base station' can be replaced by such a terminology as a fixed station, a Node B, an eNode B (eNB), an access point, an ABS and the like. And, 'mobile station (MS)' can be replaced by such a terminology as a user equipment (UE), a subscriber station (SS), a mobile subscriber station (MSS), an AMS, a mobile terminal and the like.

A transmitting end means a node for transmitting data or audio service, and a receiving end means a node for receiving the data or audio service. Therefore, a mobile station becomes a transmitting end and a base station becomes a transmitting end, in uplink. Likewise, a mobile station becomes a receiving end and a base station becomes a receiving end, in downlink.

Meanwhile, a mobile station of the present invention can include a PDA (personal digital assistant), cellular phone, a PCS (personal communication service) phone, a GSM (global system for mobile) phone, a WCDMA (wideband CMDA) phone, an MBS (mobile broadband system) phone or the like.

Embodiments of the present invention are supportable by standard documents disclosed in at least one of wireless access systems including IEEE 802 system, 3GPP system, 3GPP LTE system and 3GPP2 system. In particular, the steps or parts, which are not explained to clearly reveal the technical idea of the present invention, in the embodiments of the present invention can be supported by the above documents. Moreover, all terminologies disclosed in this document can be supported by at least one of P802.16-2004, P802.16e-2005, P802.16Rev2 and P802.16m documents which are the standards of IEEE 802.16 system.

In the following description, a preferred embodiment of the present invention is explained in detail with reference to the accompanying drawings. Detailed description disclosed together with the accompanying drawings is intended to explain not a unique embodiment of the present invention but an exemplary embodiment of the present invention. In the following description, specific terminologies used for embodiments of the present invention are provided to help the understanding of the present invention. And, the use of the specific terminology can be modified into another form within the scope of the technical idea of the present invention.

Basic principles of OFDM (orthogonal frequency division multiplexing), which are multi-carrier modulation scheme in wireless communication systems, are described as follows.

First of all, in OFDM system, a high-rate data stream is divided into a number of slow-rate data streams. This is to simultaneously transmit the data streams using a plurality of carriers. Each of a plurality of the carriers is called a subcarrier. Since orthogonality exists among a plurality of carriers in OFDM system, even frequency components of carriers are mutually overlapped with each other, they can be detected by a receiving end. A high-rate data stream is converted to a plurality of slow-rate data streams by a serial to parallel converter. A plurality of the data streams converted in parallel are multiplied by subcarriers, respectively and are then added together. The added data streams are transmitted to a receiving end.

A plurality of the parallel data streams generated by the serial to parallel converter can be carried on a plurality of subcarriers by IDFT (inverse discrete Fourier transform). In this case, it is able to efficiently implement the IDFT using IFFT (inverse fast Fourier transform). As a symbol duration of a slow-rate subcarrier increases, relative time-domain signal dispersion generated by multi-path delay spreading is reduced.

In wireless communication using this OFDM system, it is able to insert a guard interval longer than a delay spreading of channel between symbols in order to reduce inter-symbol interference. In particular, while each symbol is being transmitted on a multi-path channel, a guard interval longer than a maximum delay spread of channel is inserted between contiguous symbols. In doing so, in order to prevent inter-subcarrier orthogonality breakage, a signal in a last interval (i.e., a guard interval) of a useful symbol interval is copied and then inserted in a fore part of a symbol. This is called a cyclic prefix (hereinafter abbreviated CP).

Figure 5:
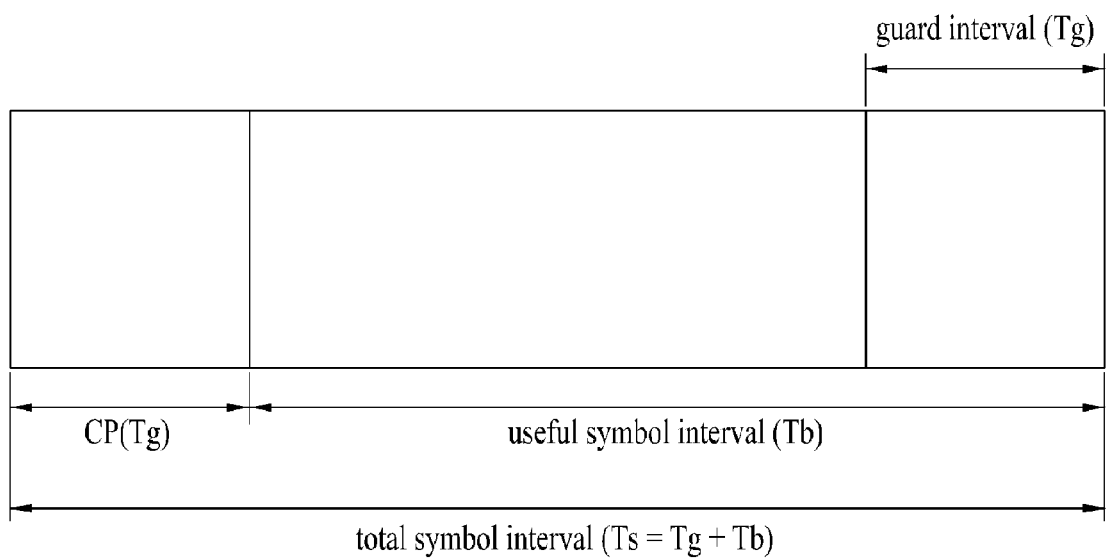
FIG. 5 is a diagram for an example of a symbol structure including a CP (cyclic prefix)

FIG. 5 is a diagram for an example of a symbol structure including a CP (cyclic prefix).

Referring to FIG. 5, a symbol duration Ts becomes a sum of a useful symbol interval Tb for carrying data actually and a guard interval Tg. A receiving end removes the guard interval and then performs demodulation by taking data for the useful symbol interval. A transmitting end and a receiving end may be synchronized with each other using a cyclic prefix code and the inter-data symbol orthogonality is maintained. In this case, a symbol of the present invention may be an OFDMA symbol.

In the following description, explained are frame structures (TDD frame and FDD frame) in 802.16m system with CP length (hereinafter named a CP length of ¼ Tb) corresponding to ¼ of a useful symbol length on a channel bandwidth of 7 MHz. And, a TDD frame structure, which can mutually coexist with a TDD frame structure with a CP length of ⅛ or 1/16 Tb for the same channel bandwidth of 7 MHz, will be explained. Moreover, an FDD frame structure with many commonalities with a TDD frame structure proposed by the present invention is explained as well.

In IEEE 802.16m system, subframes of 4 kinds of types exist. Theses types can be defined as follows. First of all, a first type subframe is a subframe including 6 OFDMA symbols. A second type subframe is a subframe including 7 OFDMA symbols. A third type subframe is a subframe including OFDMA symbols. And, a fourth type subframe is a subframe including 9 OFDMA symbols. In this case, the fourth type subframe may be used for a frame structure on 8.75 MHz channel bandwidth.

As shown in Table 1, OFDMA parameters in case of using a CP length of ¼ Tb on 7 MHz channel bandwidth may be defined, as the same method for a conventional method for the case of a CP length of ⅛ or 1/16 Tb. In case of with the CP length of ¼ Tb, a symbol duration of OFDM is 160 μs and relative TTG (transmit transition gap) and RTG (receive transition gap) are 140 μs and 60 μs, respectively. In consideration of the defined OFDMA parameters, in case of using a CP length of ¼ Tb, the number of symbols existing within one frame is 31. A frame structure with a CP length of ¼ Tb using the first to third type subframes according to the number of symbols used to define a subframe in a previous frame structure may be constructed.

Figure 6:
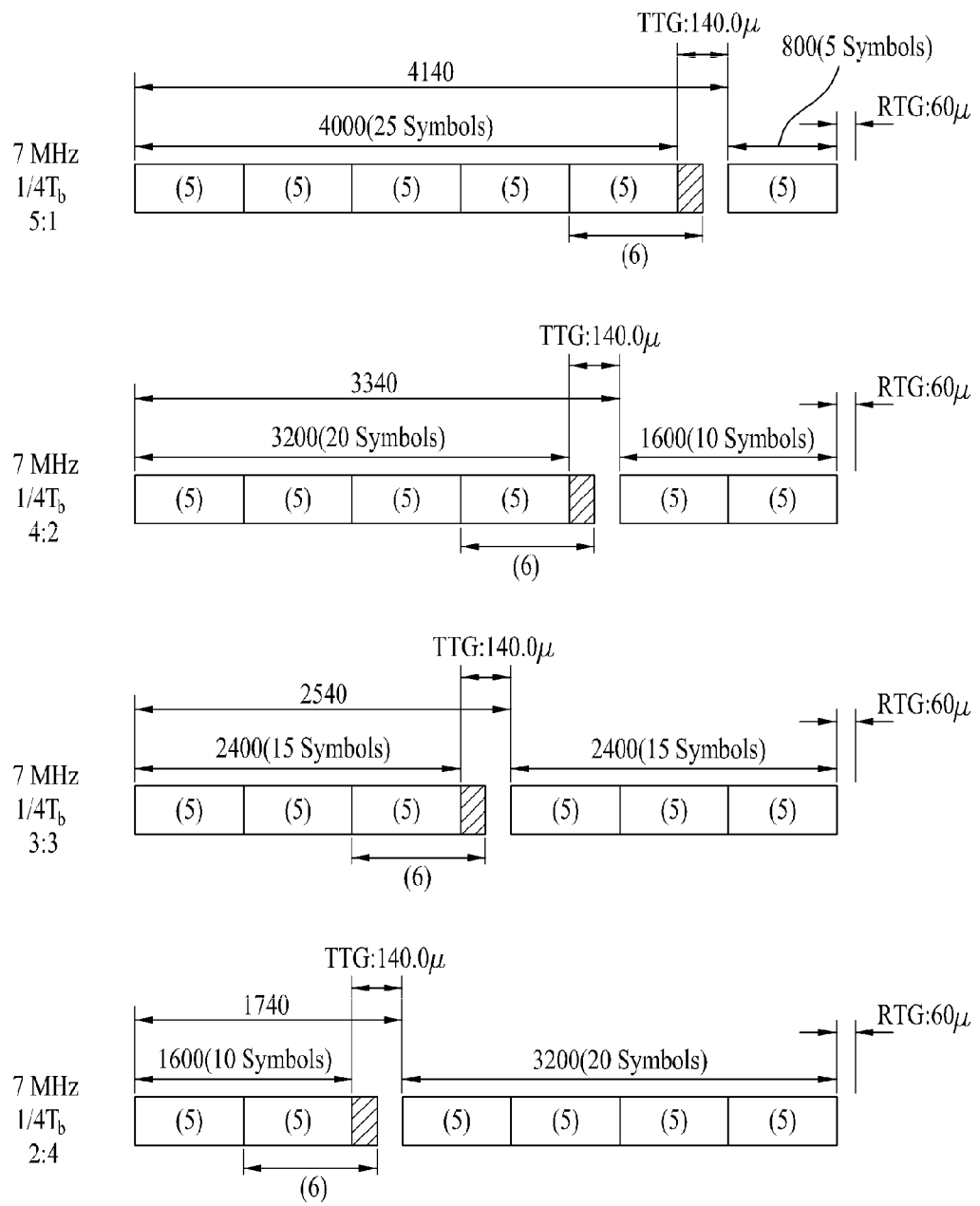
FIG. 6 is a diagram for examples of a TDD frame structure with a CP length of 1/4 Tb.

FIG. 6 is a diagram for examples of a TDD frame structure with a CP length of ¼ Tb.

Referring to FIG. 6, one frame may include 6 subframes. A TDD frame may be constructed using a previously defined a first type subframe and a third type subframe structure. The number of symbols existing within the TDD frame is 31. Thus, one frame may include 1 first type subframe and 5 third type subframes. TTG/RTG is required for switching to UL from DL in TDD frame structure unlike the FDD frame structure. In case of TDD frame, the first type subframe may be located at a last DL subframe for TTG/RTG interval. That is, one symbol may be allocated as an idle interval for TTG/RTG. In this case, one symbol of the first type subframe is allocated as idle interval so that the last DL subframe may be constructed with a third type subframe. Thus, frame is constructed by using same type subframe, it is possible to allocate symmetrically in DL and UL intervals.

The number of subframe in a frame is same with the number of subframes of a previous frame structure with different CP length (e.g., a CP length of ⅛ Tb, a CP length of 1/16 Tb, etc.), HARQ (Hybrid Automatic Repeat reQuest) protocol designed for frame structure with different CP length or control information in unit of subframe may be adopted as same type. A ratio of the number of available DL subframes to the number of available UL subframes in the TDD frame including 6 subframes is set to one of (5:1), (4:2), (3:3) and (2:4). If the ratio of the DL subframe number to the UL subframe number is (5:1), (4:2), (3:3), or (2:4), a ratio of the number of allocated symbol in the DL subframe to allocated symbol number in the UL subframe number is (25:5), (20:10), (15:15), or (10:20), respectively.

Figure 7:
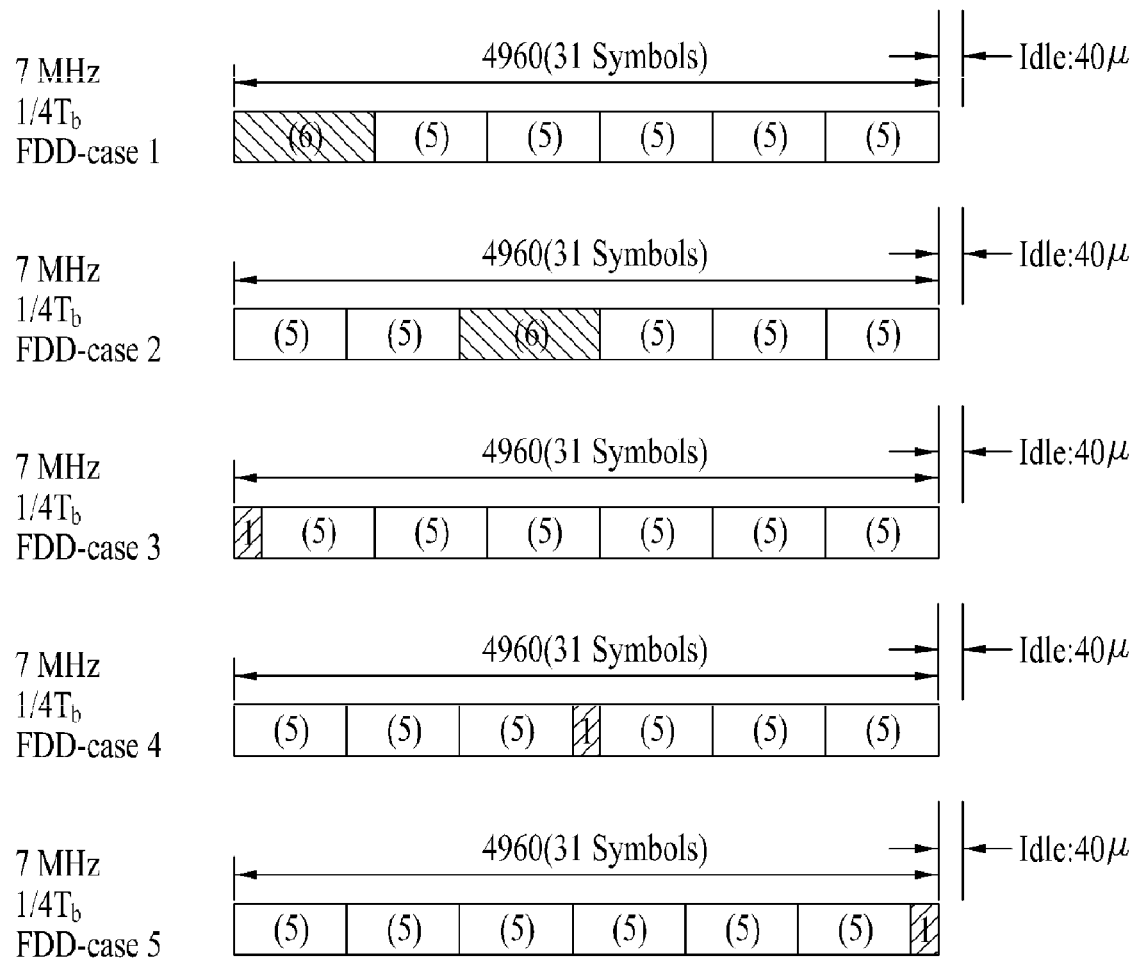
FIG. 7 is a diagram for examples of a FDD frame structure with a CP length of ¼ Tb.
Figure 8:
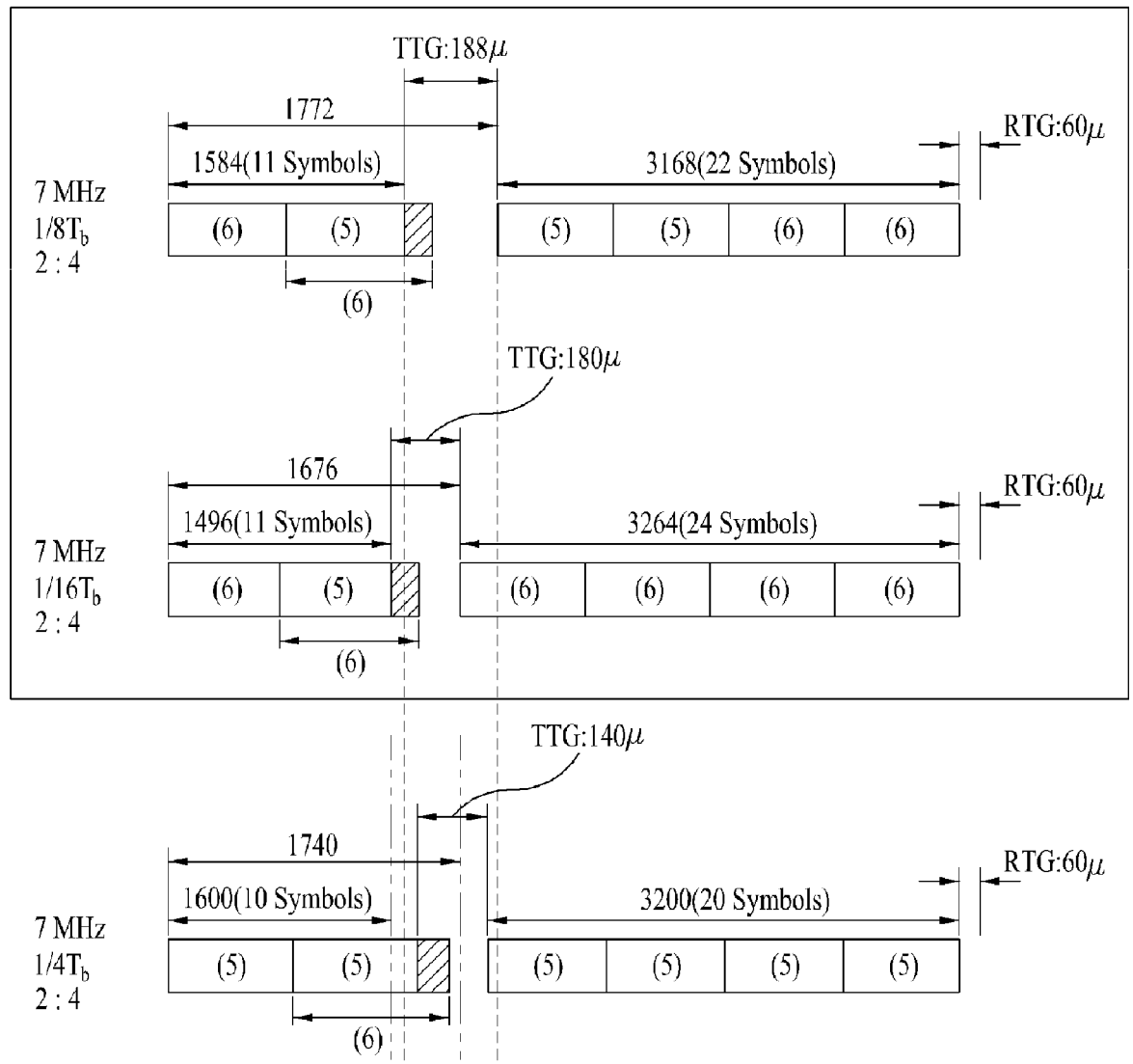
FIGS. 8 to 11 are diagrams for examples of a TDD frame structure with a CP length of ¼ Tb, which can coexist together with another TDD frame structure with a different CP length, according to a ratio of the number of DL subframes to the number of UL subframes, respectively.
Figure 9:
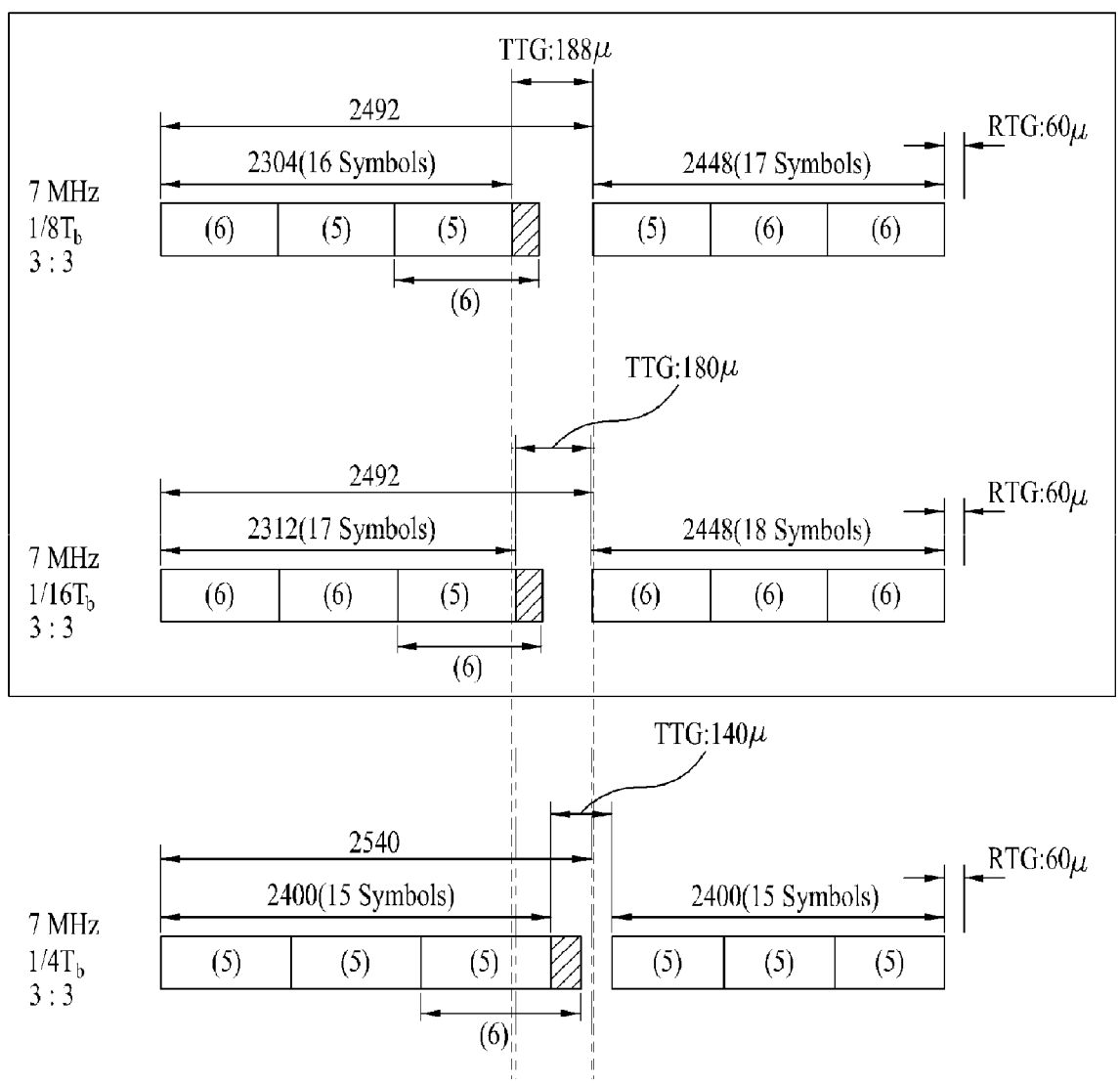
Figure 10:
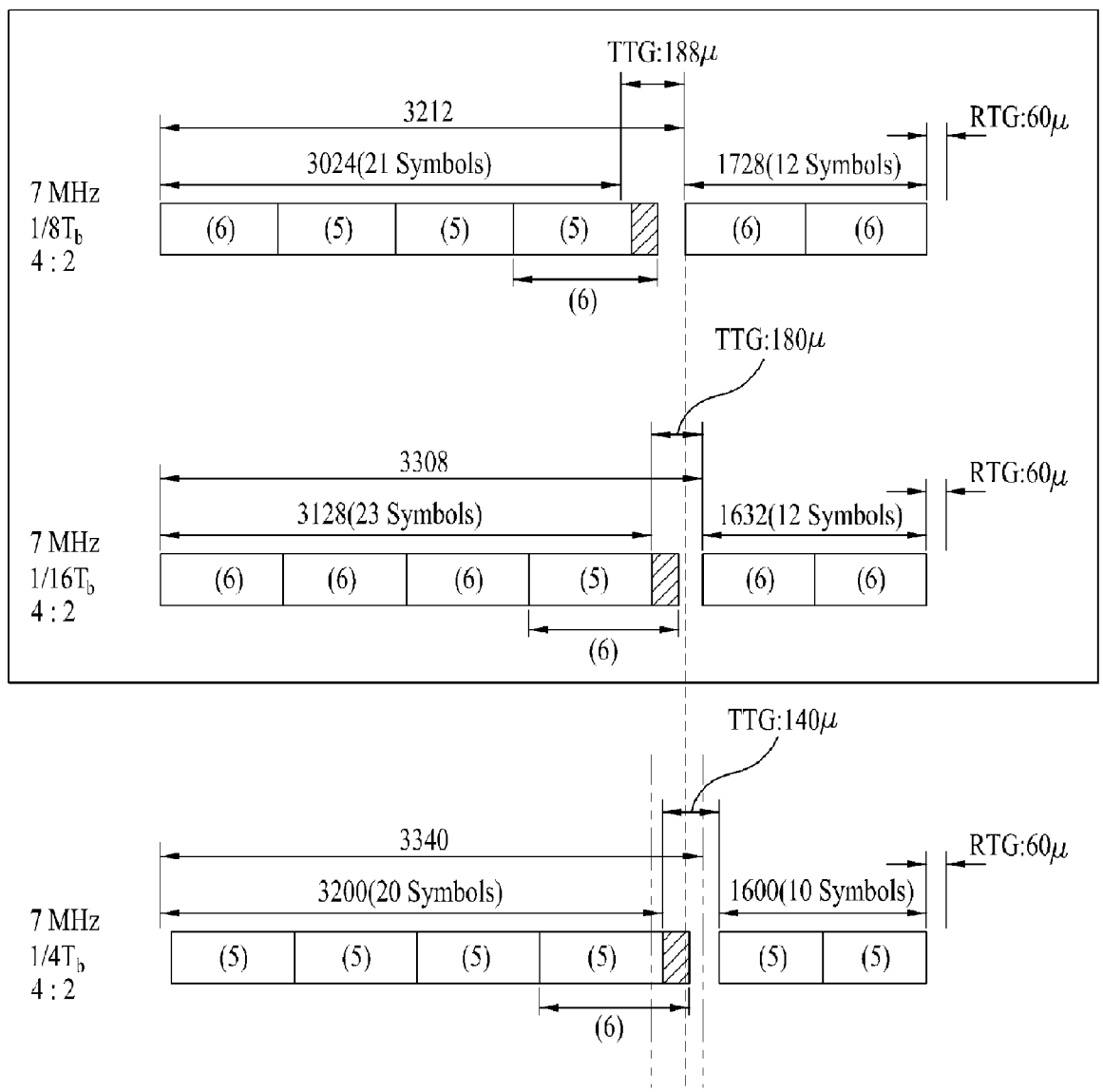
Figure 11:
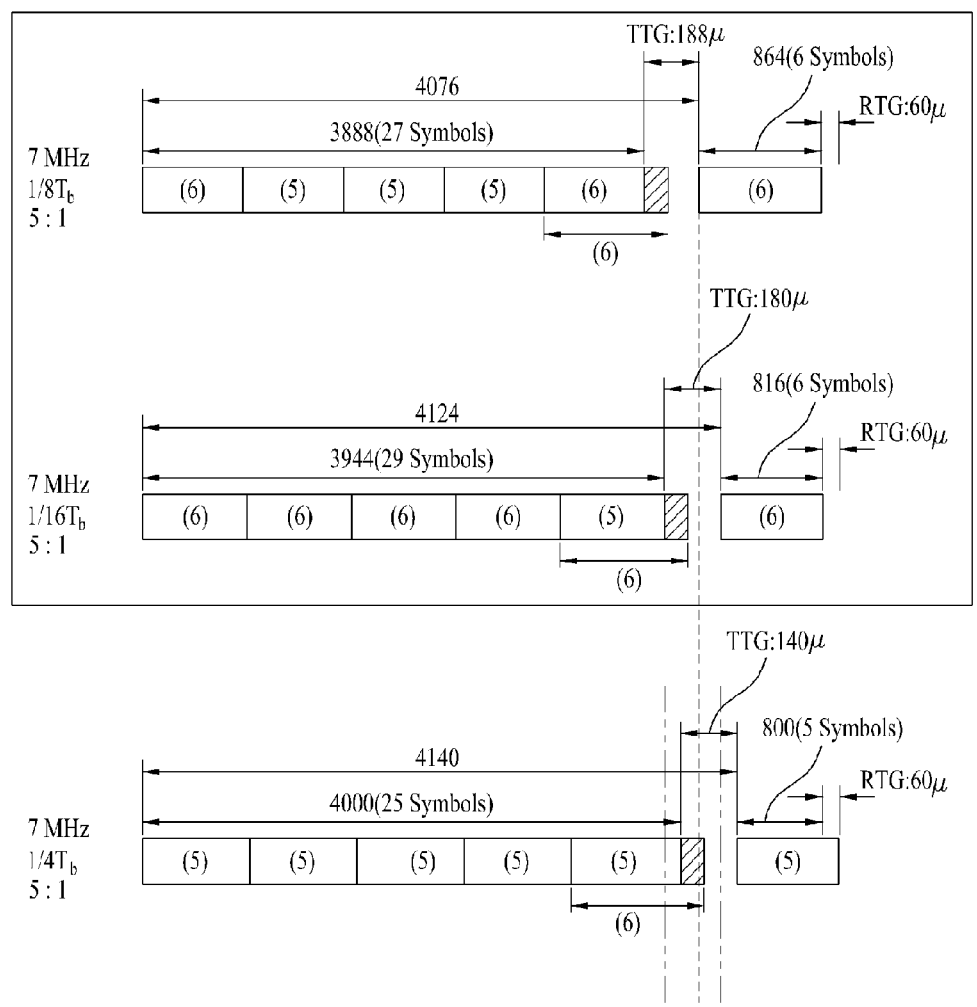

FIG. 7 is a diagram for examples of a FDD frame structure with a CP length of ¼ Tb.

A FDD frame structure shown in FIG. 7 is frame structure corresponding to the TDD frame structure shown in FIG. 6. The FDD frame may include 6 subframes. 31 symbols may be allocated to the FDD frame. Since the FDD frame structure unlike TDD frame structure does not need TTG/RTG interval, the FDD frame structure may further utilize one symbol compared to TDD frame structure. Various Methods for using the additional one symbol will be described.

In the first case, a first type subframe is configured by adding the one symbol to one third type subframe among a plurality of third type subframes constructed with 5 symbols. In consideration of the H-FDD frame structure and two groups, there is a quite possibility that idle interval symbol is located at center of the FDD frame, the subframe including additionally allocated one symbol is preferably located at a second subframe or a third subframe in FDD frame.

A first type subframe including 6 symbols may be located at a first subframe in a frame to reuse SFH design of channel bandwidth for 5 MHz, 10 MHz, and 20 MHz. However, the location of the first type subframe is just exemplary, the locations of the subframe including additionally allocated one symbol is non-limited in the FDD frame structure.

In a second case, the additional one symbol is allocated to a first subframe, in the FDD frame so that the additional one symbol is located at a front of the FDD frame. Since symbol located at a front of the FDD frame need further control information in unit of symbol (e.g., preamble, frame control header (FCH)), added symbol may be used for the control information, a third type subframe may be used for data transmission.

In a third case, in consideration of the H-FDD frame structure or mid-amble in a frame, one symbol may independently or additionally be allocated between a third subframe and a fourth subframe in the frame. This is just exemplary, the location of additional one symbol is non-limited in the FDD frame structure.

In a fourth case, the additional one symbol may be allocated next to a last subframe of the FDD frame. In doing so, a previous subframe structure for data transmission may be used for transmitting additional information such as sounding.

FIGS. 8 to 11 are diagrams for examples of a TDD frame structure with a CP length of ¼ Tb, which can coexist together with another TDD frame structure with a different CP length, according to a ratio of the number of DL subframes to the number of UL subframes, respectively.

Referring to FIGS. 8 to 11, if a ratio of the number of DL subframes to the number of UL subframes is set to (2:4), (3:3), (4:2), or (5:1), respectively, the TDD frame structure with a CP length of ¼ Tb may coexist together with another TDD frame structure with a different. CP length. A last DL subframe located in an interval for switching from DL to UL is a first type subframe constructed with 6 symbols by including idle interval. However, in order to generate a time delay necessary for TTG interval in the TDD frame structure, a third type subframe constructed with 5 symbols by allocating one symbol to an idle interval may be located at the last DL subframe. One symbol may be allocated as idle interval of TTG/RTG in the TDD frame. This configuration is applicable irrespective of the ratio of the DL subframe number to the UL subframe number.

To prevent interference generation at a DL/UL switching point, a frame structure may be designed that 5*k (k=the number of DL subframes) OFDMA symbols are allocated to DL interval and 5*j (j=the number of UL subframes) OFDMA symbols are allocated to UL interval symmetrically. According to this configuration, third type subframes is located in DL and UL intervals, respectively so that interference generated at DL/UL switching point may be removed.

Figure 12:
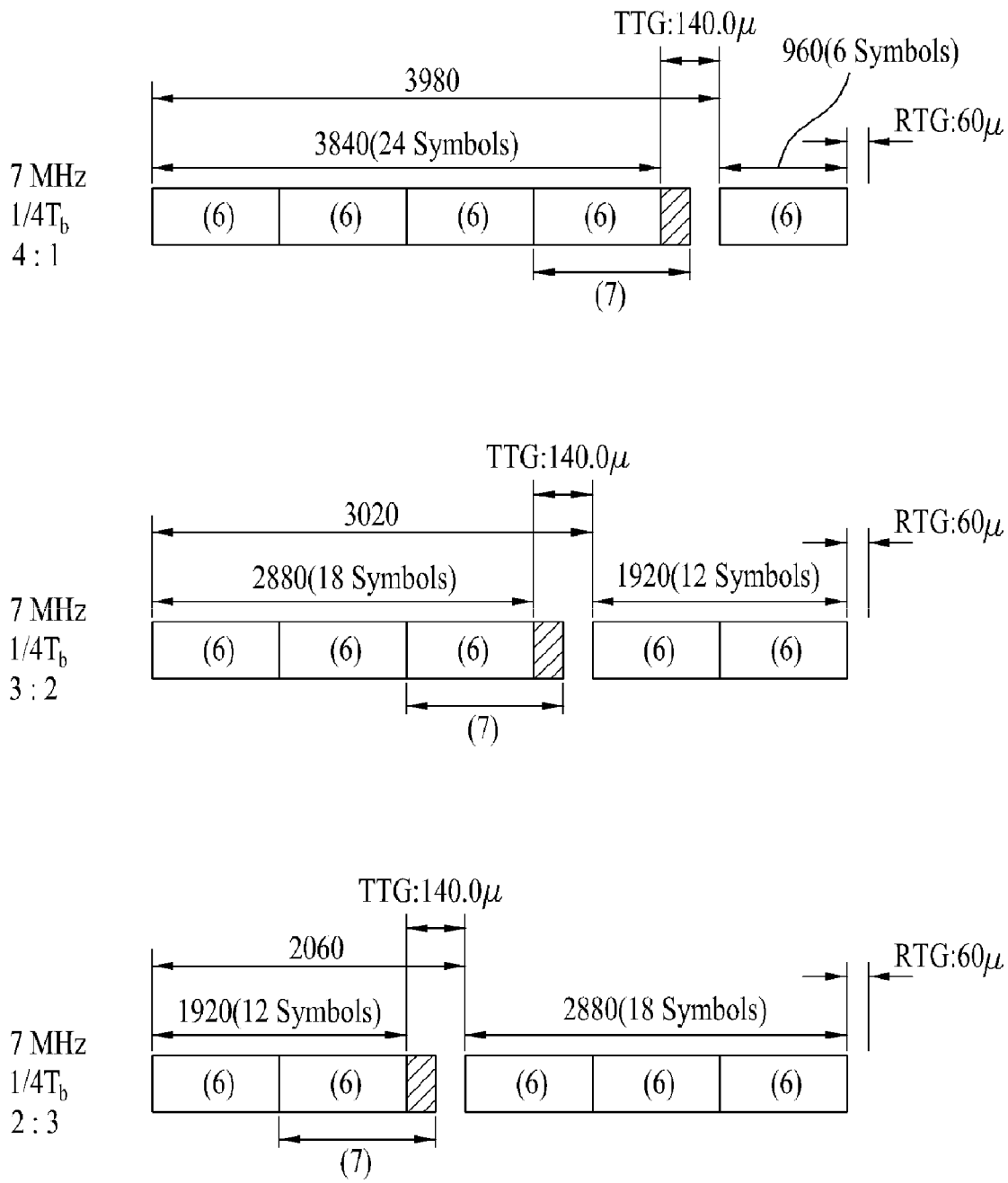
FIG. 12 is a diagram for examples of a TDD frame structure with a CP length of ¼ Tb.

FIG. 12 is a diagram for examples of a TDD frame structure with a CP length of ¼ Tb.

Referring to FIG. 12, a TDD frame may include 5 subframes. In this case, the TDD frame may include 4 first type subframes and 1 second type subframe. The TDD frame structure needs time delay for DL/UL switching. Therefore, a last symbol of a last DL subframe may be allocated as idle for TTG/RTG interval. That is, one symbol may be allocated as idle interval of TTG/RTG in the TDD frame.

A second type subframe may be located at a last DL subframe for the TTG/RTG interval in a TDD frame including 5 subframes. In this case, a symbol of the second type subframe is allocated as TTG/RTG delay time so that the last DL subframe may be configured as a first type subframe.

Thus, TDD frame is constructed with same type subframe so that downlink interval and uplink interval may be symmetrically allocated. A ratio of the number of available DL subframes to the number of available UL subframes in the TDD frame constructed 5 subframes is set to one of (4:1), (3:2), and (2:3). If, a ratio of the number of DL subframes to the number of UL subframes is (4:1), (3:2), or (2:3), a ratio of the number of allocated symbols in the DL subframe to allocated symbol number in the UL subframes number is (24:6), (18:12), or (12:18), respectively.

Figure 13:
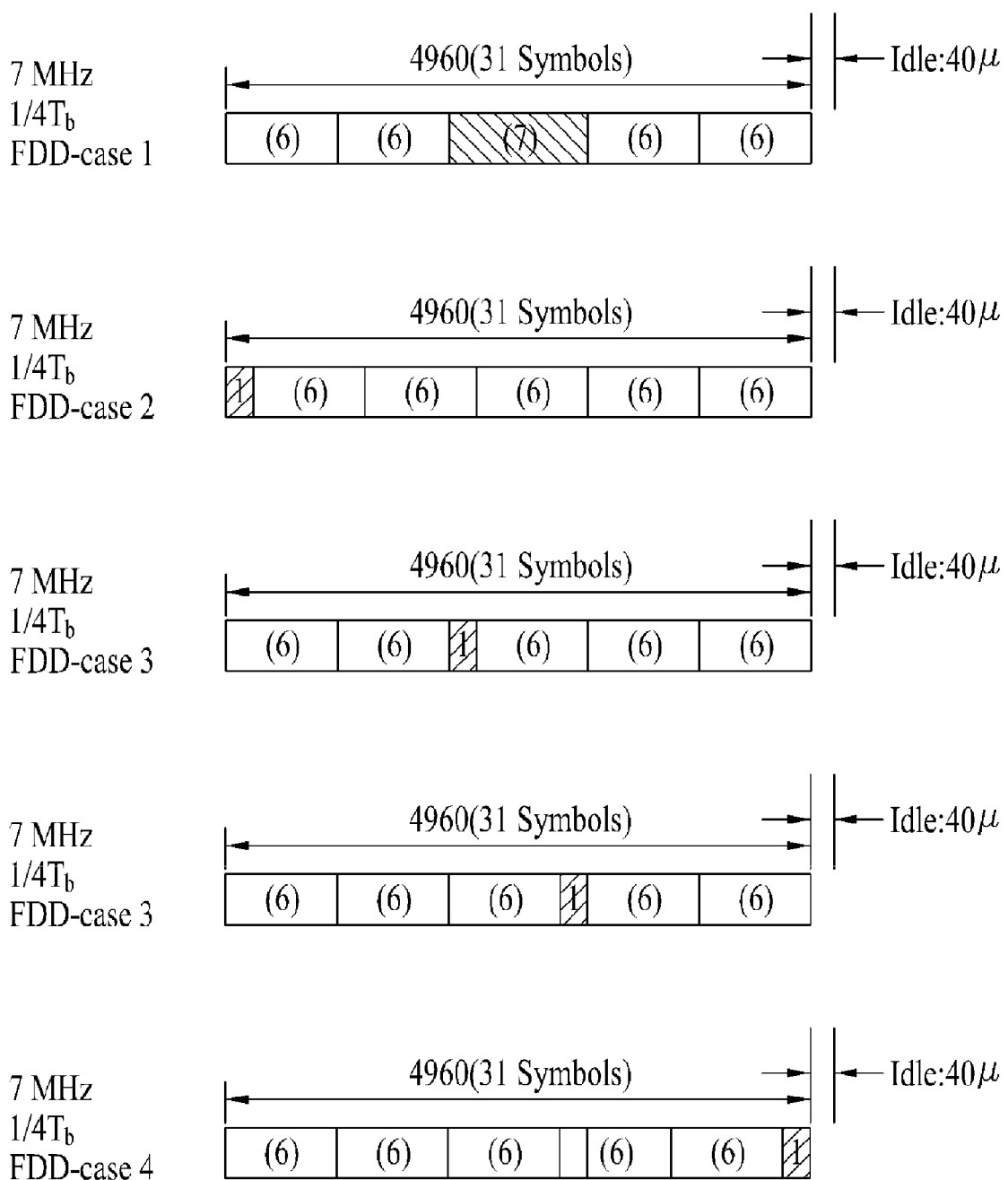
FIG. 13 is a diagram for examples of a FDD frame structure with a CP length of ¼ Tb.

FIG. 13 is a diagram for examples of a FDD frame structure with a CP length of ¼ Tb.

The FDD frame structure shown in FIG. 13 is frame structure corresponding to the TDD frame structure shown in FIG. 12. The FDD frame may include 5 subframes. 31 symbols may be allocated to the FDD frame. Since the FDD frame structure has not TTG/RTG interval unlike TDD frame structure, the FDD frame structure may further utilize one symbol compared to TDD frame structure. Various Methods for using the additional one symbol exist, but above described methods may be used.

As a first case, a second type subframe may be configured by adding the one symbol to one first type subframe among a plurality of first type subframes in a frame. In consideration of the H-FDD frame structure and two groups, there is a quite possibility that idle symbol is located at center of the FDD frame, the subframe including additionally allocated one symbol is preferably located at a second subframe or a third subframe in the FDD frame. A first type subframe including 6 symbols is preferably located at a first subframe in a frame to reuse SFH design of channel bandwidth for 5 MHz, 10 MHz, and 20 MHz. However, the location of the first type subframe is just exemplary, the location of the subframe including additionally allocated one symbol is non-limited in the FDD frame structure.

As a second case, the additional one symbol is allocated to a first subframe in the FDD frame so that the additional one symbol is located at a front of the FDD frame. Since symbol located at a front of the FDD frame need further control information in unit of symbol (e.g., preamble, frame control header (FCH)), added symbol may be used for the control information, a first type subframe may be configured and used for data transmission.

As a third case, in consideration of the H-FDD frame structure or mid-amble in a frame, one symbol may independently or additionally be located between a third subframe or a fourth subframe in the frame. This is just exemplary, the location of additional one symbol is non-limited in the FDD frame structure.

As a fourth case, the additional one symbol may be allocated next to a last subframe of the FDD frame. In doing so, a previous subframe structure for data transmission may be used for transmitting additional information such as sounding.

As describes above, the TDD frame structure for 7 MHz channel bandwidth with a cp length of ¼ Tb according to the present invention has commonality with the TDD frame structure defined for 5 MHz, 10 MHz, and 20 MHz channel bandwidth. The TDD frame structure for 7 MHz channel bandwidth with a cp length of ¼ Tb according to the present invention may coexist mutually with a frame structure with a previously defined CP length of ¹⁄₁₆ Tb and a cp length of ⅛ Tb without interference at DL/UL switching interval.

Since a subframe structure is configured by succeeding to defined subframe structure, additional definition of new subframe structure is not necessary. New frame structure is configured using basic subframe structure.

Figure 14:
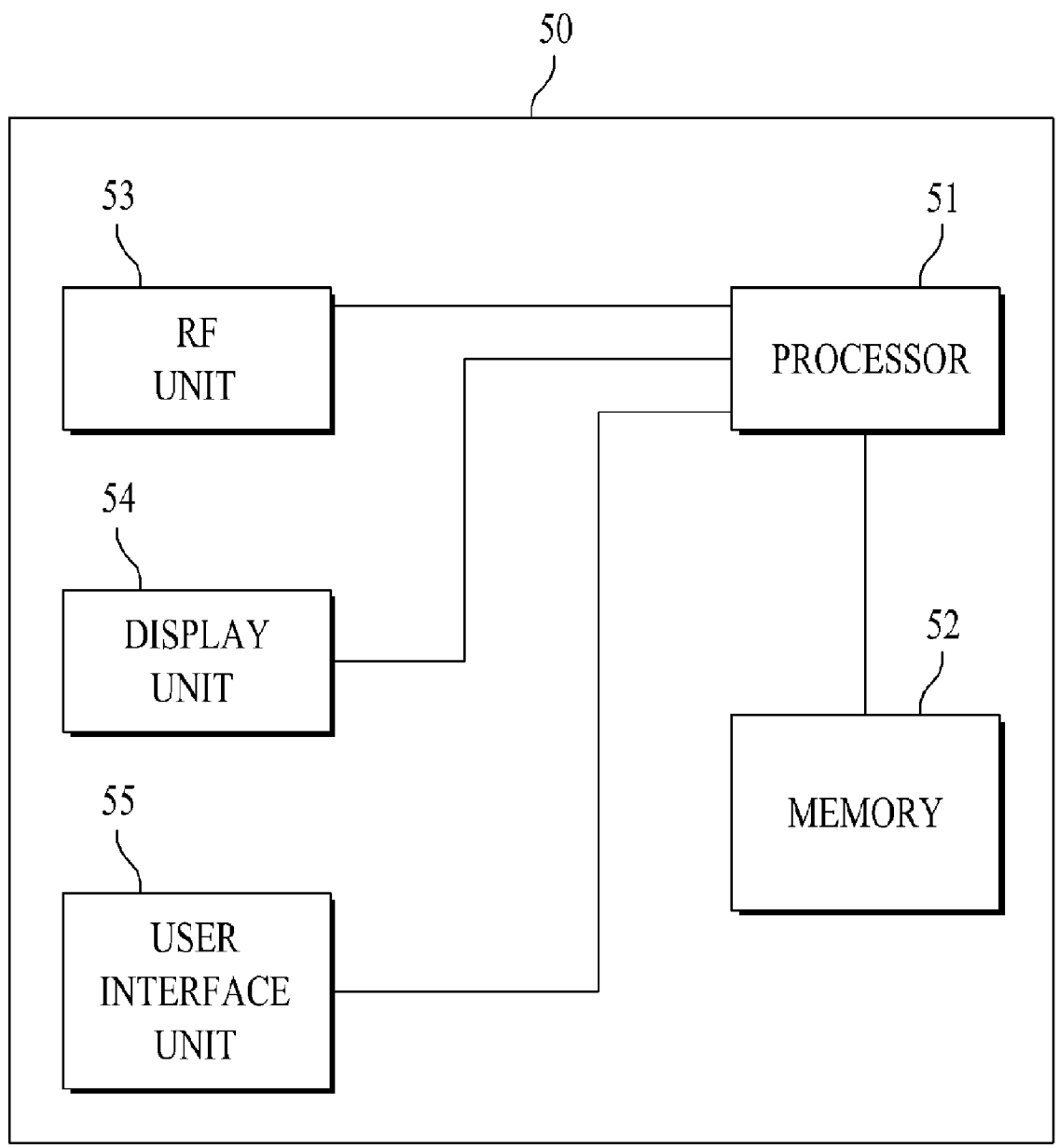
FIG. 14 is a block diagram showing constitutional elements of a device 50 that may be either the MS or the BS.

FIG. 14 is a block diagram showing constitutional elements of a device 50, that may be either the MS or the BS, and that can perform the methods of FIGS. 6 to 13. Device 50 includes a processor 51, a memory 52, a radio frequency (RF) unit 53, a display unit 54, and a user interface unit 55. Layers of the radio interface protocol are implemented in the processor 51. The processor 51 provides the control plane and the user plane. The function of each layer can be implemented in the processor 51. The processor 51 may also include a contention resolution timer. The memory 52 is coupled to the processor 51 and stores an operating system, applications, and general files. If device 50 is a MS, the display unit 54 displays a variety of information and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals. The RF unit 53 may include transmitting module, receiving module, transceiving module.

Layers of a radio interface protocol between the UE and the network can be classified into a first layer (L1), a second layer (L2), and a third layer (L3) based on the lower three layers of the open system interconnection (OSI) model that is well-known in the communication system. A physical layer, or simply a PHY layer, belongs to the first layer and provides an information transfer service through a physical channel. A radio resource control (RRC) layer belongs to the third layer and serves to control radio resources between the UE and the network. The UE and the network exchange RRC messages via the RRC layer.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Embodiments of the present invention can be implemented using various means. For instance, embodiments of the present invention can be implemented using hardware, firmware, software and/or any combinations thereof. In the implementation by hardware, one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transceiving a signal using a frame structure in a wireless communication system, the method comprising:

transceiving the signal through an FDD (frequency division duplex) frame according to the frame structure,
   wherein the FDD frame comprises 5 subframes that comprise 4 first type subframes, each of the 4 first type subframes including 6 OFDMA (orthogonal frequency division multiple access) symbols and 1 second type subframe including 7 OFDMA symbols, and
   wherein a channel bandwidth of the FDD frame is set to 7 MHz.

2. The method of claim 1, wherein the second type subframe is a fourth subframe in the FDD frame.

3. The method of claim 1, wherein an idle time is located next to a last subframe in the FDD frame.

4. The method of claim 1, wherein the FDD frame further comprises a CP (cyclic prefix) that has a length set to ¼ of a useful symbol length.

* * * * *